(12) United States Patent
Becker

(10) Patent No.: US 7,919,213 B1
(45) Date of Patent: Apr. 5, 2011

(54) FUEL CELL BIPOLAR PLATE AND COMPOSITION THEREFORE

(76) Inventor: Rolf R. Becker, Rancho Cordova, CA (US)

( * ) Notice: Subject to any disclaimer, the term of this patent is extended or adjusted under 35 U.S.C. 154(b) by 1274 days.

(21) Appl. No.: 11/502,242

(22) Filed: Aug. 9, 2006

Related U.S. Application Data

(60) Provisional application No. 60/707,041, filed on Aug. 9, 2005.

(51) Int. Cl.
*H01M 8/24* (2006.01)
*H01M 2/34* (2006.01)
*H01M 4/64* (2006.01)

(52) U.S. Cl. .................................... 429/518; 429/457

(58) Field of Classification Search .................. None
See application file for complete search history.

(56) References Cited

U.S. PATENT DOCUMENTS

| | | | | |
|---|---|---|---|---|
| 4,125,680 A * | 11/1978 | Shropshire et al. | ............... | 429/4 |
| 5,482,792 A * | 1/1996 | Faita et al. | ..................... | 429/437 |
| 5,733,678 A * | 3/1998 | Ledjeff et al. | ................. | 429/465 |
| 2002/0155333 A1* | 10/2002 | Fitts et al. | ........................ | 429/26 |
| 2002/0177027 A1* | 11/2002 | Yeager et al. | ................... | 429/34 |
| 2004/0229993 A1 | 11/2004 | Huang | | |
| 2005/0244700 A1* | 11/2005 | Abd Elhamid et al. | ......... | 429/34 |

* cited by examiner

*Primary Examiner* — Dah-Wei D Yuan
*Assistant Examiner* — Adam A Arciero
(74) *Attorney, Agent, or Firm* — Heisler & Associates

(57) ABSTRACT

A bipolar plate is provided which is constructed of a composite material including at least thirty percent carbon and up to seventy percent of a flowable resin. The material is flowed into a mold and hardened, preferably by heat or catalyst, to form the bipolar plate. The resin is preferably a polyester resin which, along with the carbon, can function effectively within a bipolar plate of a fuel cell. A method for forming bipolar plates from a composite material including carbon and a flowable resin, by flowing the material into a mold, is also provided. Specific compositions for the composite material are also provided.

1 Claim, 7 Drawing Sheets

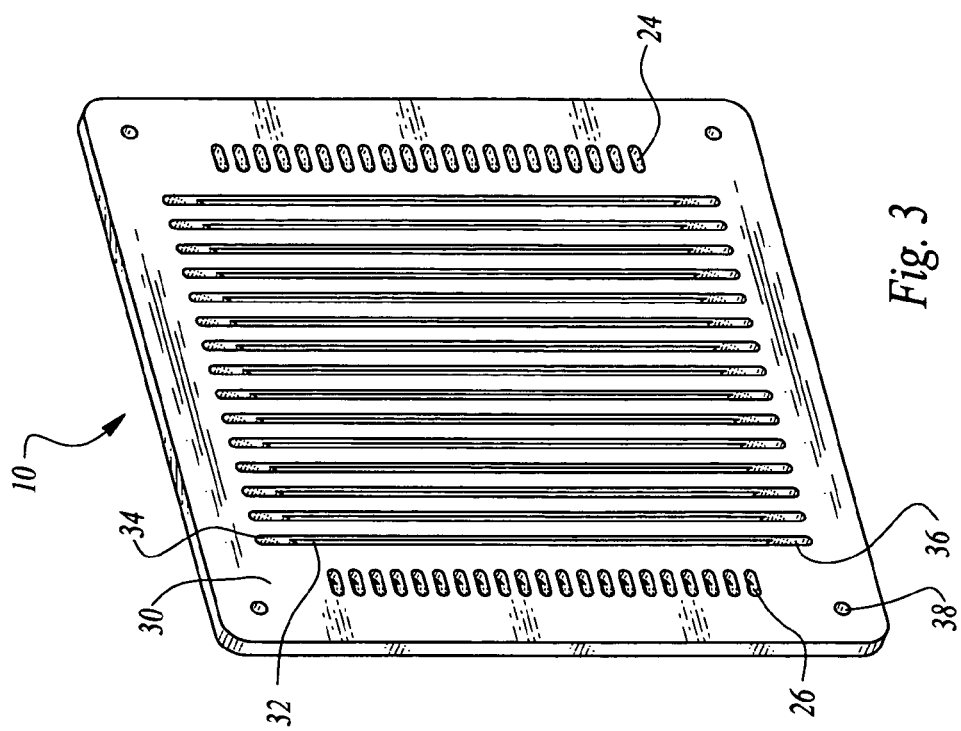
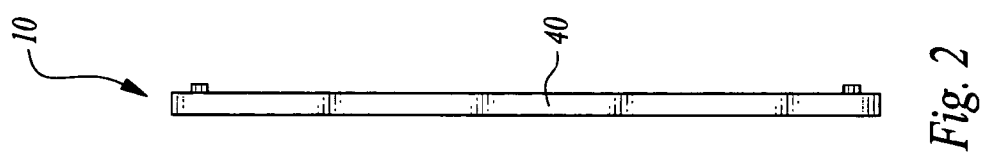
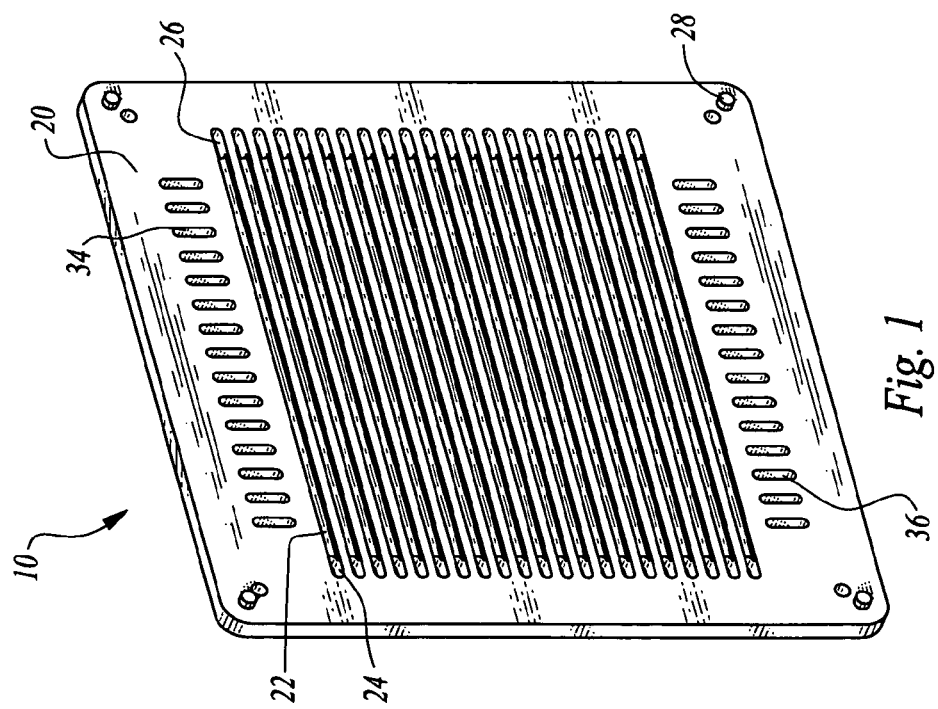
Fig. 1
Fig. 2
Fig. 3

FUEL CELL BIPOLAR PLATE AND COMPOSITION THEREFORE

CROSS-REFERENCE TO RELATED APPLICATIONS

This application claims benefit under Title 35, United States Code §119(e) of U.S. Provisional Application No. 60/707,041 filed on Aug. 9, 2005.

FIELD OF THE INVENTION

The following invention relates to bipolar plates such as those used in a fuel cell. More particularly, this invention relates to bipolar plates which are formed of a carbon and resin composite material capable of being molded and maintaining high performance when incorporated within a fuel cell.

BACKGROUND OF THE INVENTION

A typical fuel cell includes a plurality of bipolar plates with membrane electrode assembly (MEA) membranes interposed therebetween. Flow pathways are formed on the sides of the bipolar plates to bring reactants (in a simplest case, hydrogen and oxygen) adjacent the MEA, with the result that the overall cell converts the reactants into a product (typically water) and simultaneously generates an electric current through the stack.

Typical bipolar plates are formed of graphite with the graphite initially being provided in sheets and then machined to include the recesses through which the reactants flow. To optimize performance, the location, shape and size of these recesses and the bipolar plates themselves must be carefully controlled. Due to the unique nature of graphite material, it has not heretofore been successfully molded into bipolar plates. Rather, the graphite sheets have required machining to form the recesses. The graphite material is not particularly easily machined. Hence, the bipolar plates typically end up comprising at least thirty percent (and often a majority) of the overall cost of the fuel cell. Accordingly, a need exists for a bipolar plate which can be formed in a different and less expensive fashion while still maintaining the performance requirements required for the bipolar plate.

Additionally, typical prior art bipolar plates formed of graphite are exceptionally rigid. Thus, the entire fuel cell is somewhat susceptible to performance interruption should the bipolar plates become cracked. In many environments where fuel cells are to be utilized, shock loads exist that make the prior art bipolar plates susceptible to such cracking or other failure. Accordingly, a need exists for bipolar plates which can maintain fuel cell function but which are sufficiently flexible and have sufficient strength to resist cracking or other failure when shock loads are experienced.

SUMMARY OF THE INVENTION

With this invention a composition is identified from which bipolar plates can be formed through a molding process and still maintain performance specifications similar to those of machined rigid graphite bipolar plates. In particular, the most preferred composition of this composite material, referred to as formulation A, is 36.5 percent polyester resin in styrene, 1.0 percent plasticizer, 0.5 percent cobalt carboxylate mixture in a solution that is about six percent cobalt, 2.5 percent polytetrafluoroethylene, 53.3 percent graphite, 1.7 percent methylethylketone, 2.5 percent styrene and 2.0 percent organic peroxide methylethylketone catalyst. All percentages based on weight. Other formulations are also disclosed which slightly vary from the above preferred embodiment. In general, any compositions that include thirty percent or more carbon and up to seventy percent of polyester resin are included within the scope of this invention.

This material is mixed into a homogeneous mixture and then placed within a mold where the material is compressed, such as in a twelve ton press for a ten centimeter by ten centimeter bipolar plate. The mold is optionally heated, such as to a temperature of 90° C. for one minute, to accelerate hardening of the composite material. The composite material is then removed from the press and has been molded into the final bipolar plate shape including the required reactant recesses. Resulting performance when tested in a fuel cell (described in detail herein below) were similar to those of prior art machined graphite bipolar plates. When an ohm meter was applied to the individual bipolar plate with a three millimeter thickness and sandwiched between two copper plates, a resistance reading of 0.3 ohms was obtained, further indicative of satisfactory performance in a fuel cell.

OBJECTS OF THE INVENTION

Accordingly, a primary object of the present invention is to provide a material which is capable of being molded and which also functions satisfactorily as a material within a bipolar plate of a fuel cell.

Another object of the present invention is to provide a fuel cell bipolar plate which can be manufactured by molding.

Another object of the present invention is to provide a fuel cell bipolar plate which exhibits a relatively high degree of flexibility when compared to prior art bipolar plates.

Other further objects of the present invention will become apparent from a careful reading of the included drawing figures, the claims and detailed description of the invention.

BRIEF DESCRIPTION OF THE DRAWINGS

FIG. 1 is a perspective view of a typical bipolar plate such as that which can be molded according to the method of this invention and utilizing the composition of this invention.

FIG. 2 is a side elevation view of that which is shown in FIG. 1.

FIG. 3 is a perspective view of an opposite side of that which is shown in FIG. 1.

DESCRIPTION OF THE PREFERRED EMBODIMENT

Figure 4:
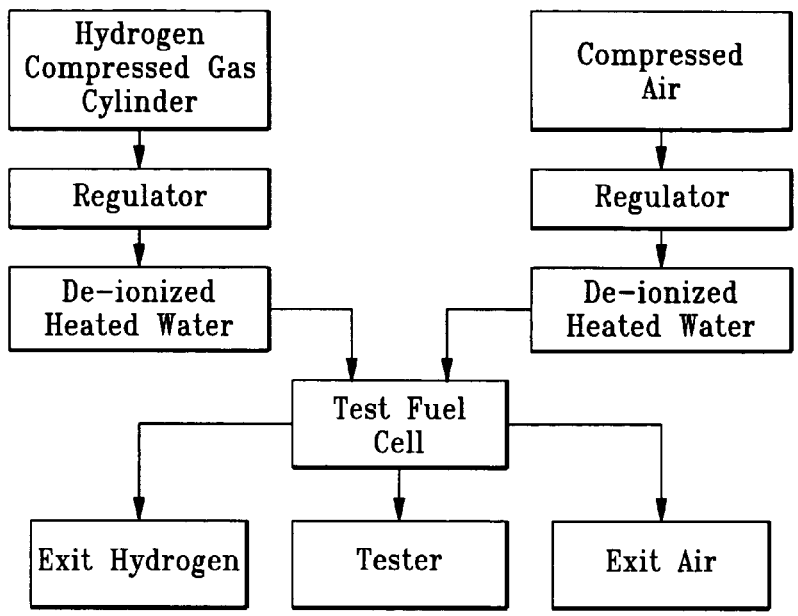
FIG. 4 is a flow diagram of a single cell fuel cell test equipment arrangement.

Referring to the drawings, wherein like reference numerals represent like parts throughout the various drawing figures, reference numeral 10 is directed to a bipolar plate (FIGS. 1-3) according to this invention. The bipolar plate 10 is formed of a unique formulation which is formable by molding and which exhibits adequate performance characteristics within a fuel cell.

The geometry of the fuel cell 10 could be any geometry desired to provide the associated performance selected by the designer of the fuel cell. The material from which the fuel cell is formed according to this invention can be used with bipolar plates 10 having a variety of different configurations. Thus, the bipolar plate depicted in FIGS. 1-3 is merely one exemplary bipolar plate with which the composition of this invention can be successfully utilized.

In this particular environment, the bipolar plate has a hydrogen side 20 and an oxygen side 30 (note that reactants other than hydrogen and oxygen could be utilized and this terminology is selected for convenience and not as a limitation). An edge 40 defines a periphery of the bipolar plate. In this embodiment the hydrogen side and oxygen side each measure ten centimeters by ten centimeters with a thickness of about three millimeters.

On the hydrogen side 20, a series of preferably horizontal recesses 22 are provided. Each recess extends from an inlet 24 passing entirely through the plate 10 to an outlet 26 passing entirely through the plate 10. In between, the recess 22 has a limited depth into the hydrogen side 20. Registration posts 28 or other registration features are also preferably provided on the hydrogen side 20 to allow the bipolar plate 10 to be precisely aligned with adjacent bipolar plates or other structures of the fuel cell.

The oxygen side 30 has a series of preferably vertically oriented reactant recesses 32 formed therein. Each of these recesses 32 extends from an inlet 34 to an outlet 36. The inlet 34 and outlet 36 pass entirely through the plate 10, while the recess 32 between the inlet 34 and outlet 36 extends only a limited depth into the oxygen side 30. Registration holes 38 or other registration features are provided on the oxygen side 30 to allow the bipolar plate 10 to be precisely aligned with adjacent bipolar plates.

Because the inlet 34 and outlet 36 pass entirely through the plate 10, they can also be seen on the hydrogen side 20 (FIG. 1). Similarly, because the inlet 24 and outlet 26 on the hydrogen side 20 pass entirely through the plate 10, they can also be seen on the oxygen side 30 (FIG. 3). These inlets and outlets are aligned with inlets and outlets of other bipolar plates so that two overall separate inlet manifolds and two outlet manifolds can be provided for the two reactants being fed into the entire fuel cell stack.

Each hydrogen side 20 is oriented within a fuel cell directly adjacent to a membrane electrode assembly (MEA) membrane which separates each bipolar plate 10 from adjacent bipolar plates. Other details of the bipolar plates 10 and the fuel cell constructed from the bipolar plates 10 can be selected by a skilled fuel cell designer to meet the performance characteristics desired for the fuel cell.

The material from which the bipolar plate 10 is formed is unique in that it can be flowed into a mold for shaping of the material into the bipolar plate 10, such as that shown for example in FIGS. 1-3. The material is a homogeneous mixture that is initially flowable but hardens into a solid form during the molding process. The formulation considered to be most preferred, and which was the subject of the examples provided below is identified as formulation A and particularly includes 36.5 percent polyester resin in styrene, 1.0 percent plasticizer, 0.5 percent cobalt carboxylate mixture in a solution that is about six percent cobalt, 2.5 percent polytetrafluoroethylene, 53.3 percent graphite, 1.7 percent methylethylketone, 2.5 percent styrene and 2.0 percent organic peroxide methylethylketone catalyst. All percentages based on weight.

Particular details of these constituents of the composition and sources for particular constituents are provided as follows. The particular polyester resin in styrene that was tested is a trade secret formulation provided by Bayer MaterialScience, LLC of Pittsburgh, Pa. under the trademark ROSKYDAL 500 A and identified as Material No. 3497953. The plasticizer is particularly a material provided by the C.P. Hall company of Stow, Ohio under the trademark PLASTHALL. The material is a plasticizer and softener for use in natural and synthetic polymers and rubber.

The cobalt solution is a cobalt carboxylate in a six percent solution with a solvent of mineral spirits with between 5.8 and 6.2 percent metal content. The material particularly tested was provided by DURA Chemicals, Inc. of Alameda, Calif. under the trademark DUROCT.

The particular polytetrafluoroethylene source for the preferred formulation is provided by Dyneon, LLC of Oakdale, Minn. under the trademark TF-9201.

The expandable graphite is particularly described as graphite/acid-washed graphite flake and also referred to as acid-treated graphite flake and is provided by Graftech, Inc. of Lakewood, Ohio under the trademark GRAFGUARD and with product identifier "160-80N." The particular material is described as being at least 70 percent graphite, between 0.0 and 25 percent sulfuric acid, between 0.0 and 15 percent nitric acid, less than 0.3 percent crystalline silica and between 1.0 and 3.0 percent of an undisclosed trade secret ingredient.

Carbon in the form of carbon black or other carbon forms can be substituted for a portion of the graphite, such that the carbon in the composite material is not entirely graphite. Carbon black is not entirely graphite. Carbon black is lighter than graphite, tending to make the plates lighter. However, too much carbon black or other carbon substitution can degrade fuel cell performance and make the mixture too thick to flow into the mold. Hence, it is preferred that the carbon be a majority graphite. One source of carbon black is Akzo Nobel Polymer Chemicals, LLC of Chicago, Ill., provided under the trademark KETJENBLACK and with the product identifier EC600JD.

The methylethylketone (MEK) and organic peroxide methylethylketone were obtained from Tap Plastics of Sacramento, Calif. in their standard commercial forms.

Other particular formulations which underwent limited testing and were considered to be at least to some degree effective included formulations B, C and D (with all percentages being weight percentages unless otherwise specified). Formulation B particularly includes 27.4 percent polyester resin in styrene, 1.0 percent plasticizer, 1.6 percent cobalt carboxylate mixture in a solution that is about 6.0 percent cobalt, 4.0 percent polytetrafluoroethylene, 60 percent expandable acid washed graphite flake, 0.8 percent methylethylketone, 2.7 percent styrene and 2.5 percent organic peroxide methylethylketone catalyst. Formulation C particularly includes 17.5 grams polyester resin in styrene, 0.5 grams plasticizer, 2.0 grams cobalt (6.0 percent solution), 2.5 grams polytetrafluoroethylene, 25 grams graphite, 0.5 grams methylethylketone, 1.5 grams styrene and 1.5 grams of catalyst such as organic peroxide methylethylketone. Formulation D particularly includes 175 grams graphite and a liquid pre-mixture of 60 grams polyester resin in styrene (20 to 30 percent styrene), 2.5 grams plasticizer, 7.0 grams polytetrafluoroethylene and 0.50 cc of six percent cobalt solution with enough styrene added to dilute the liquid pre-mixture to 150 grams before mixing with the graphite.

One technique for formulation construction is to have as much carbon (graphite, carbon black or other suitable carbon forms) as possible while still maintaining the flowable characteristics of the composite composition. Compositions were tested with as little as thirty percent carbon. These compositions flowed easily before hardening but had less satisfactory resistivity characteristics, making them only moderately effective as bipolar plates within a fuel cell. As the percentage of carbon exceeded fifty percent, the material was still a flowable liquid but became thicker and thicker, making mixing more difficult and flowing into the mold more difficult. Due to the shape of the bipolar plate being amenable to a simple clam shell press mold, even exceptionally highly viscous composite material compositions could be effectively pressed into small cavities within the mold due to the high pressure associated with the press, such as twelve tons in one test. In one test heat of 90° C. was added to the mold to accelerate the hardening of the mixture within the mold.

With more advanced machine mixing, effective mixing was obtained with a carbon percentage of sixty percent. As the carbon percentage goes higher than sixty percent, maintaining the homogeneity of the mixture and achieving full mixing becomes increasingly difficult, as well as flowing the material into the mold. However, at fifty to sixty percent carbon content, the other constituents within the composition did not noticeably inhibit performance of the material when formed into a bipolar plate and tested within a fuel cell. also, the portion of the carbon that is carbon black influences viscosity, with more carbon black increasing viscosity. In one example a mix of three parts carbon black to fifty parts graphite maintained flowability of the mixture and did not noticeably diminish plate performance. By keeping the carbon a majority graphite the best results are obtained.

Most preferably, the organic peroxide methylethylketone is added last as a catalyst to cause hardening of the mixture. Heat also causes hardening, thus the catalyst can be emitted (or reduced) if heat is added to the mold during the molding process. Styrene can be added if the mixture requires dilution.

In particular, the following examples illustrate the performance of the preferred material identified above as formulation A when molded into a bipolar plate and tested.

Example 1

Executive Summary. Marshall Miller, Ph.D., Program Manager for the Hybrid Vehicle Power Systems Laboratory at the University of California, Davis was engaged to perform an independent neutral assessment of the functionality and performance of molded carbon composite fuel cell bipolar plates comprised of formulation A. The purpose of the test was to confirm that this plate technology performed comparable to a standard, high cost graphite fuel cell plate. Test results over a period of two days demonstrated that this plate technology functioned appropriately and the performance was similar to that expected from graphite plates normally used in fuel cells. Based upon these test results, there is every expectation that such fuel cell plates will perform well in fuel cell systems and can be used as a much more economic alternative to standard graphite and other plate systems currently available. When compared to the common fuel cell practice of machining graphite plates, this plate technology provides a cost reduction of roughly two orders of magnitude.

Introduction. This report describes a series of tests performed on a single cell fuel cell built by inventor. The purpose of these tests was to determine if the molded carbon plates performed similarly to conventional graphite plates during cell operation. Carbon plates in fuel cells perform two functions. First, they provide channels for the reactant gases (hydrogen and oxygen from air) to enter the cell. Second, they must have low electrical resistance such that electrons can pass through them with minimal losses.

The testing protocol involved discharging (operating) the single cell (comprised of a commercial catalytic membrane (MEA) enclosed within two molded carbon plates molded using formulation A and the molding method of this invention) at various currents over two days. The test setup did not allow for ideal control of the cell temperature or humidity, which would have optimized performance of the catalytic membrane component, which is the effective source of the electrical current produced by the cell.

The catalytic membrane, also known as the membrane electrode assembly (MEA), is the cell component that dominates the cell electrical response. Since the operating condition of the cell membrane could not be optimized, lower current discharge levels from the cell primarily reflect on the MEA performance, in concert with an inability to control the MEA operating environment (temperature, humidity, reactant gas flow). Weaker current performance generally indicates a poor MEA or poor cell environment.

Test Setup. The cell was tested in the Hybrid Vehicle Power Systems Laboratory at the University of California, Davis. The cell was constructed using MEAs (the commercially available membrane) provided by Ion Power, Inc. of Newcastle, Del., gas diffusion layers and two molded plates according to this invention. The plates were molded with simple flow fields on one side of each plate. The entire cell was compressed between two aluminum plates. FIGS. 1-3 show generally the form of the plates utilized. FIG. 4 provides a simplified schematic of the test system setup.

An air compressor supplied compressed air to a regulator that was set up to roughly 5 psig. The compressed air was passed through a plastic bottle partially filled with de-ionized water to provide some humidification. The humidified air then entered the cell at the cathode. After passing through the flow fields at the cathode, the air was vented through a valve to the atmosphere. The valve could be partially closed to vary the flow of air through the system. Since the air passed freely through the system, the water in the plastic bottle bubbled throughout the testing.

Hydrogen from a compressed gas cylinder (K bottle) was passed through a regulator set at roughly 5 psig to a plastic bottle partially filled with de-ionized water. Again, the de-ionized water was intended to provide some humidification of the hydrogen gas. The humidified hydrogen then entered the cell at the anode. The hydrogen exited the flow fields at the anode and was dead-ended by a valve. Testing could be performed with the valve closed or open to roughly regulate the flow of hydrogen. Opening the hydrogen dead end valve both purged the anode and caused the water in the hydrogen bottle to bubble freely. Valves upstream of the plastic bottles on both the hydrogen and air lines could be closed to shut off supply to the cell.

The two bottles of de-ionized water used to humidify the air and hydrogen were placed in a water bath that was heated using a hot plate. The water was generally kept between 140° F.-180° F. The hot water bath served to heat the input gases and increase the humidification of the input gases.

The tests were run on an Arbin Instruments BT-2043 cycler. The Arbin cycler features computer controlled charge and discharge steps with current and voltage data acquisition. The channel used to perform the testing was capable of measuring 0-20 volts and −5 to 5 amps. A J-style temperature probe was available for temperature measurements. The cycler was calibrated shortly before the testing commenced.

Test Procedure. Testing on the cell began by connecting it to both the gas supply and the Arbin cycler. The air and hydrogen valves were opened to supply gas to the cell. The hydrogen generally remained dead-ended throughout the test. At times the hydrogen valve was opened partially or fully to either purge or to humidify the anode, as required. The cell voltage was noted to make sure that the cell was performing properly. The cells were run at low currents to first condition the MEAs and to measure their current producing capability. After initial conditioning, three types of runs were performed.

Conditioning Runs. Similar to batteries, new MEAs (or fuel cells) must be conditioned. The initial performance is relatively poor, and the cell must be discharged for many hours to gradually bring the performance up to nominal levels. With any new fuel cell or new MEA, it is difficult to know the exact conditioning required. One important result produced from these tests is the existence of this conditioning effect.

To condition the cells, many runs were performed where the discharge current from the cell was begun at a relatively low value and then incrementally increases to higher values as the run progressed. Runs began at 50 mA and then increased values between 70 and 200 mA. Generally, the earlier current steps lasted for 30-100 seconds while the last current value lasted for at least 300 seconds. The current values varied from run to run, but the general trend was to increase the final current value. There were nineteen conditioning runs. Some were aborted early due to problems with control of humidity or temperature.

During the test runs, some operating conditions varied. The air and hydrogen pressure was increased to 8-9 prig during earlier runs to increase the current discharge capability of the cell. Additionally, the temperature of the aluminum plates was varied from 28° C.-42° C. through the combination of ambient conditions and the delivery temperature of both air and hydrogen. The flow of air and hydrogen was varied by opening or closing the gas exit valves.

As earlier stated, water management is critical to cell operation. The air and hydrogen must be adequately humidified to optimize MEA performance, but air flow must be sufficient to avoid flooding the cell with water, which severely degrades MEA performance. Consequently, test conditions were varied to try to ensure an adequately humidified cell that was not flooded with water.

Variable Current Test Runs to Produce Cell Voltage-Current (VI) Performance Curves. Measurements were taken to produce the cell VI (voltage-current) curve. This relationship determines the voltage (and power) output of the cell as a function of the cell discharge current. The cell efficiency can be calculated from the voltage at each current point. This cell efficiency is primarily a measurement of the MEA performance when the plate conductivity is satisfactory. The test procedure for capturing data to establish the VI curve measurements is given below:

1. Rest the cell (no current discharge) for five seconds.
2. Discharge (operate) the cell at 10 mA for ten seconds, while collecting voltage data.
3. Discharge (operate) the cell at 20 mA for ten seconds, while collecting voltage data.
4. Increase cell discharge current by 10-20 mA/step (discharging for ten seconds for each incremental step), while collecting corresponding voltage data.
5. Continue increasing the discharge current to a maximum of 200 mA for ten seconds, while collecting voltage data.
6. Rest the cell and end test.

The test was performed when the temperature of the aluminum plate was roughly 40° C. Data was taken every second during these runs where current was varied.

Constant Current Test Runs. The final tests were six constant runs. The procedure for these runs is given below:
1. Rest the cell for five seconds.
2. Discharge the cell at 100 mA for three hundred seconds (five minutes).
3. Rest the cell and end the test.

Data was taken every five seconds throughout the test.

Figure 5:
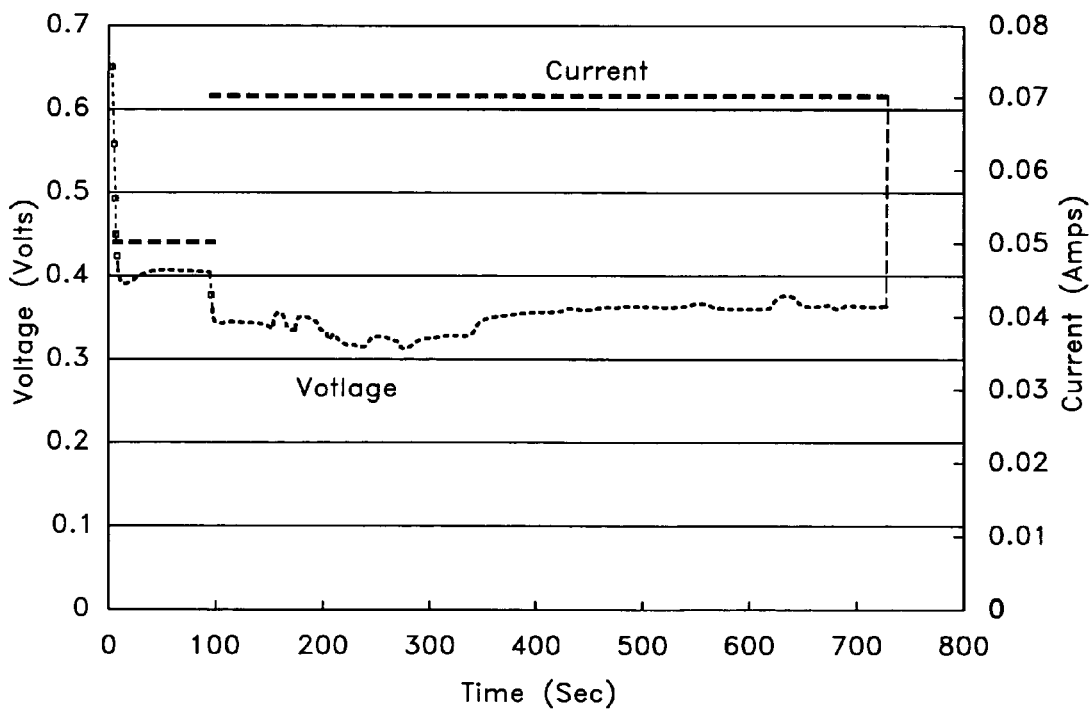
FIGS. 5-8 are graphs of voltage and current over time resulting from testing of the bipolar plate of this invention.

Test Data. FIGS. 5-8 show test results for four conditioning runs. FIG. 5 shows the voltage versus time for the third conditioning run. The initial current was 50 mA, and the final current was 70 mA. The final data point was taken with no current. Since the cell had not yet gone through much conditioning, the voltages were fairly low (0.3-0.4 V). During the long 70 mA discharge several effects were seen. There were regions where the voltage varied due to changes in the gas pressure, cell humidity, cell temperature, or perhaps conditioning effects. It is difficult to determine which of these variables caused each effect. There was an overall trend toward increasing voltage as the run progressed. That trend was consistent with cell conditioning.

Figure 6:
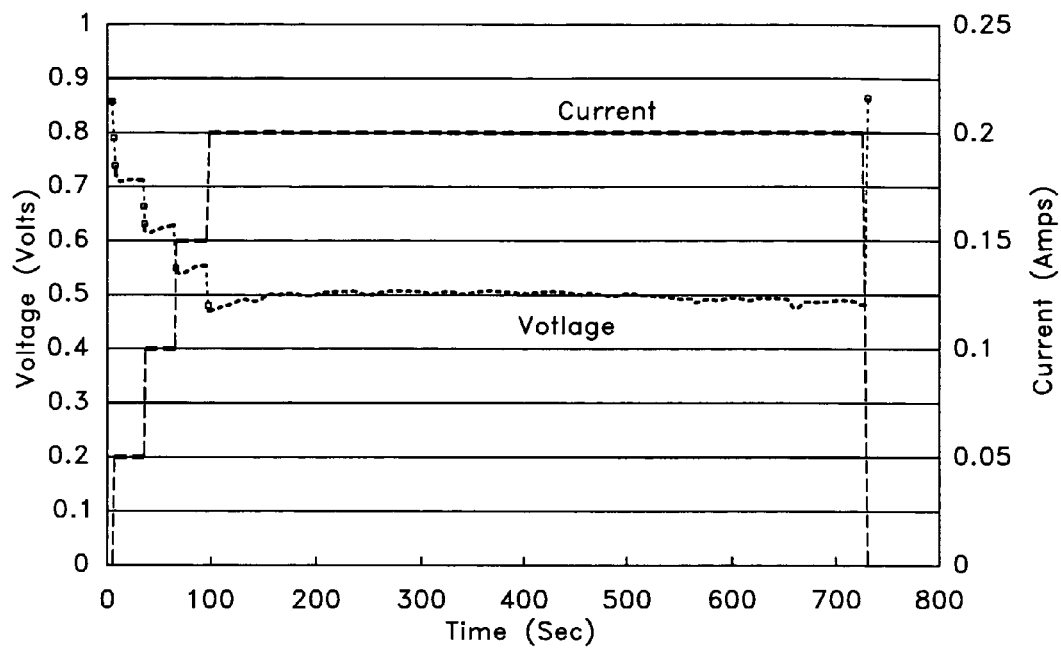
Figure 7:
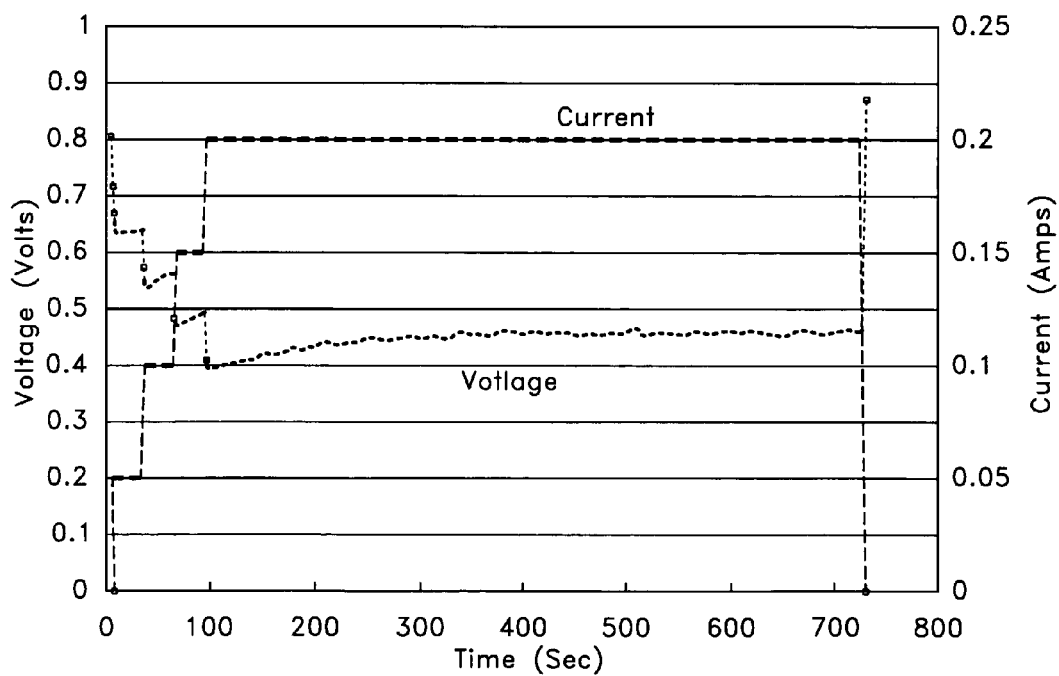

FIGS. 6 and 7 show the voltage versus time for the fifteenth and sixteenth run respectively. In the fifteenth run, the initial current was 50 mA. The cell was discharged at 100, 150 and 200 mA. The final data point was taken at open circuit with no current, producing a voltage of 0.88 volts. The runs were very similar with each showing the voltage increasing with time for every current step. There was a significant delay between the two runs (roughly thirty minutes), and the cell temperature and humidity had dropped significantly at the start of run sixteen. The cell voltage in run fifteen was higher than in run sixteen most likely due to the lower temperature and humidity. In the sixteenth run, the initial current was 50 mA and the cell was discharged at 100, 150 and 200 mA. The final data point was taken at open circuit with no current, producing a voltage of 0.88 volts.

Figure 8:
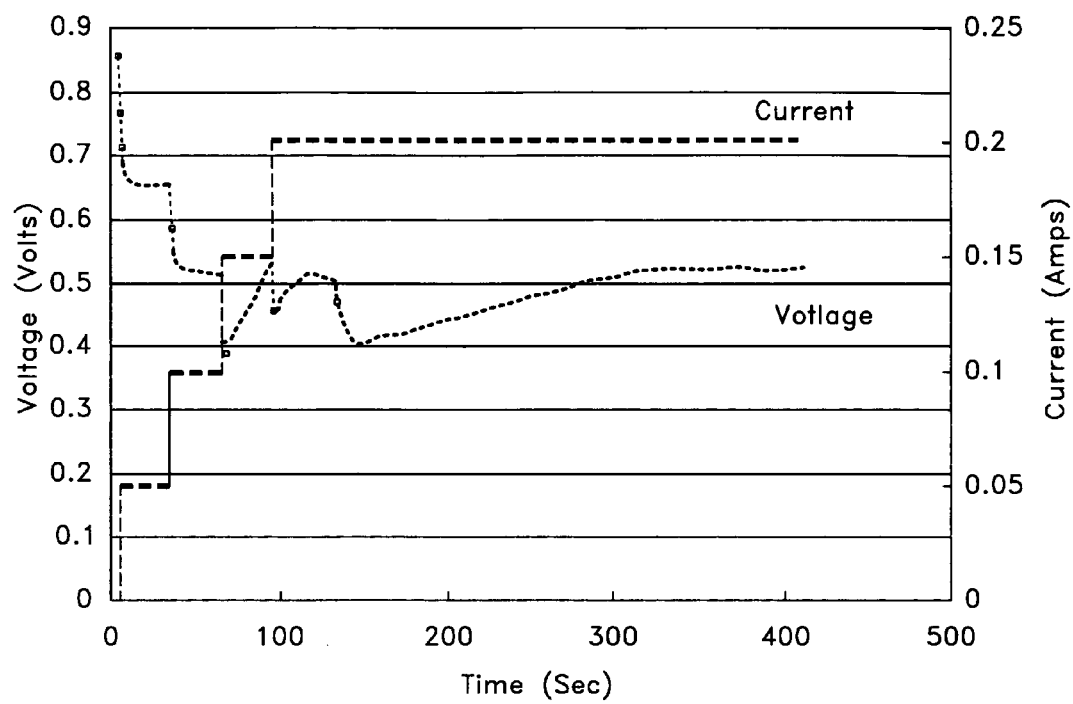

FIG. 8 shows the voltage versus time for the nineteenth and final conditioning run. While the cell voltage shows periods of decline, again the overall trend is an increase. The final voltage for the 200 mA current step is the highest voltage measured at 200 mA during all the conditioning runs. The initial current was 50 mA. The cell was discharged at 100, 150 and 200 mA.

Figure 9:
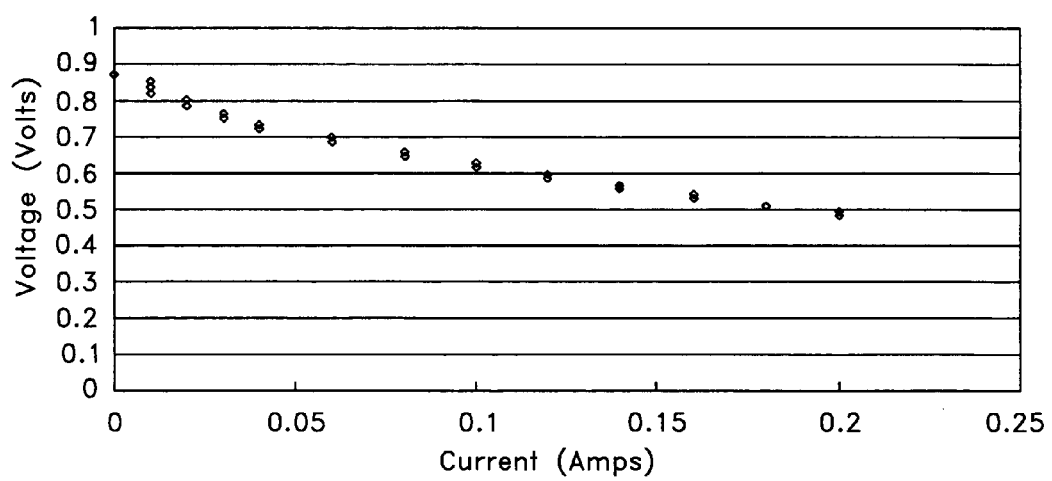
FIG. 9 is a graph of voltage over current resulting from testing of the bipolar plate according to this invention.

FIG. 9 shows the Voltage-Current (VI) curve for the cell. The curve shows a voltage decrease over the first 20-30 mA followed by a more gradual linear decline out to 200 mA. This result indicates normal fuel cell operation.

Figure 10:
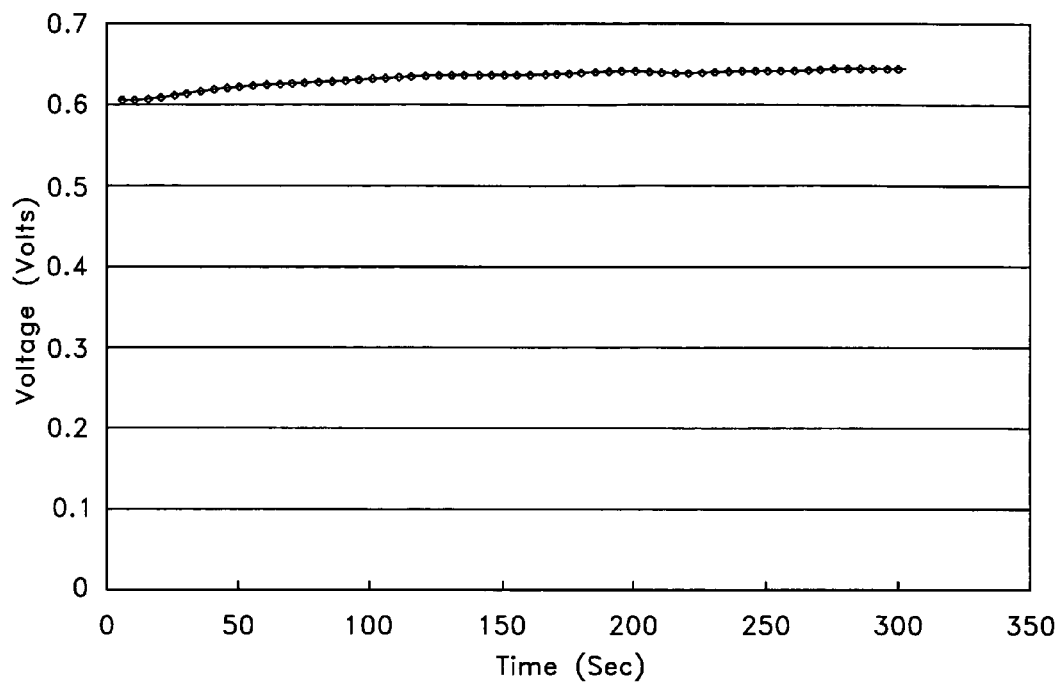
FIGS. 10-13 are graphs of voltage over time resulting from further testing of the bipolar plate according to this invention.
Figure 11:
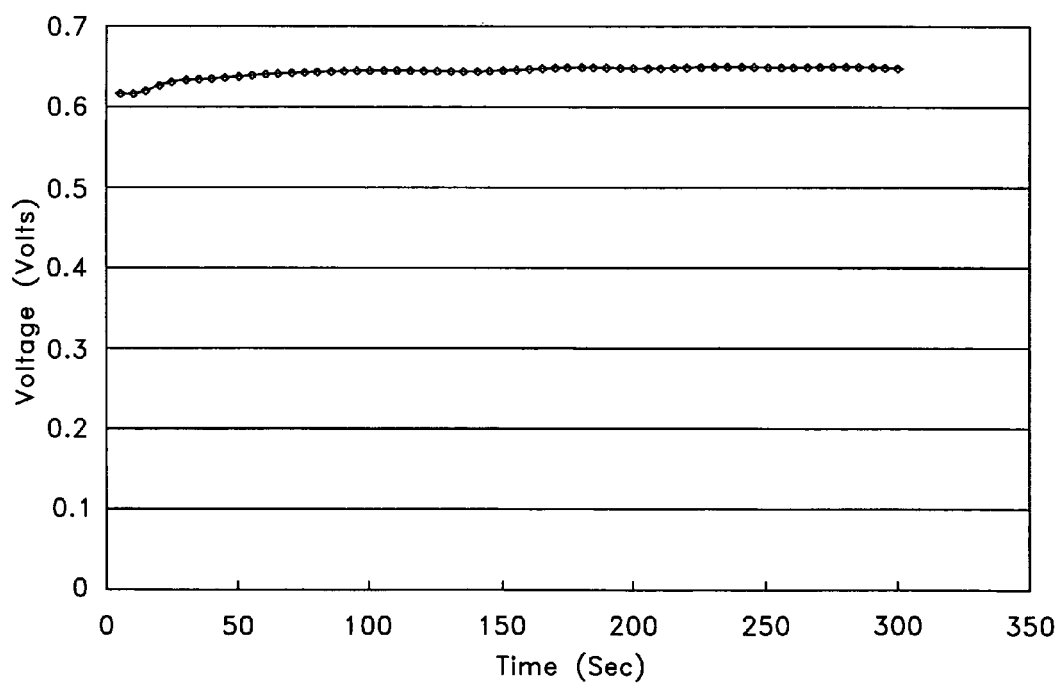

FIGS. 10 and 11 show voltage versus time data for constant current runs at 100 mA. These runs are the final two test runs. Both show gradual voltage increases tapering off with time. The cell is stable and still showing signs of increased performance consistent with conditioning.

Conclusion. The results of the cell tests demonstrate that this molded carbon plate technology provided normal fuel cell performance. Variation in cell voltage from the test can be attributed to normal variables affecting the behavior of the MEA, sandwiched between the plates. Changes in temperature, cell humidity, and gas pressure can have significant effects on MEA performance. In addition, normal MEA conditioning can be seen throughout the testing period.

Throughout the test, the plate technology functioned appropriately and the performance was similar to that expected from prior art graphite plates normally used in fuel cells. From this data, there is every expectation that these plates will perform well in fuel cell systems and can be used as a much more economic alternative to standard graphite and other plate systems currently available.

Example 2

Further testing was performed using the same molded carbon composite fuel cell plates (formulation A) with a higher current output membrane electrode assembly (MEA).

Although the plates performed well in the initial testing (Example 1), the Ion Power, Inc. ("Ion") membrane electrode assembly ("MEA") did not perform especially well, generating lower current than expected. Consequently, an election was made to run additional tests using the same plates with a new Ion MEA to reconfirm satisfactory performance from the plates. This document describes details of the additional testing along with results.

The new Ion MEA performed substantially better than the previous Ion MEA, generating roughly five times the current, and, the plates worked extremely well in both the initial tests (Example 1) and this subsequent test (Example 2).

Test Setup and Procedure. The test setup was essentially identical to that described in "Test Setup" of Example 1. The single cell fuel cell tests consisted of the identical molded plates (formulation A) along with an Ion Power, Inc. MEA and commercial gas diffusion layers. Plastic plates were used to support the cell rather than the aluminum plates described earlier. The only functional difference between the two fuel cells tested for this report was the Ion Power, Inc. MEAs.

The additional testing included several conditioning test runs, constant current test runs, and a variable current test run. These test runs are described in the "Test Procedure" section of Example 1. FIG. 4 shows a schematic of the test setup. This setup was identical to earlier test runs. During the constant current test runs, the cell was discharged at 1 A. This value is ten times the current for the constant current test runs of FIGS. 10 and 11.

Figure 12:
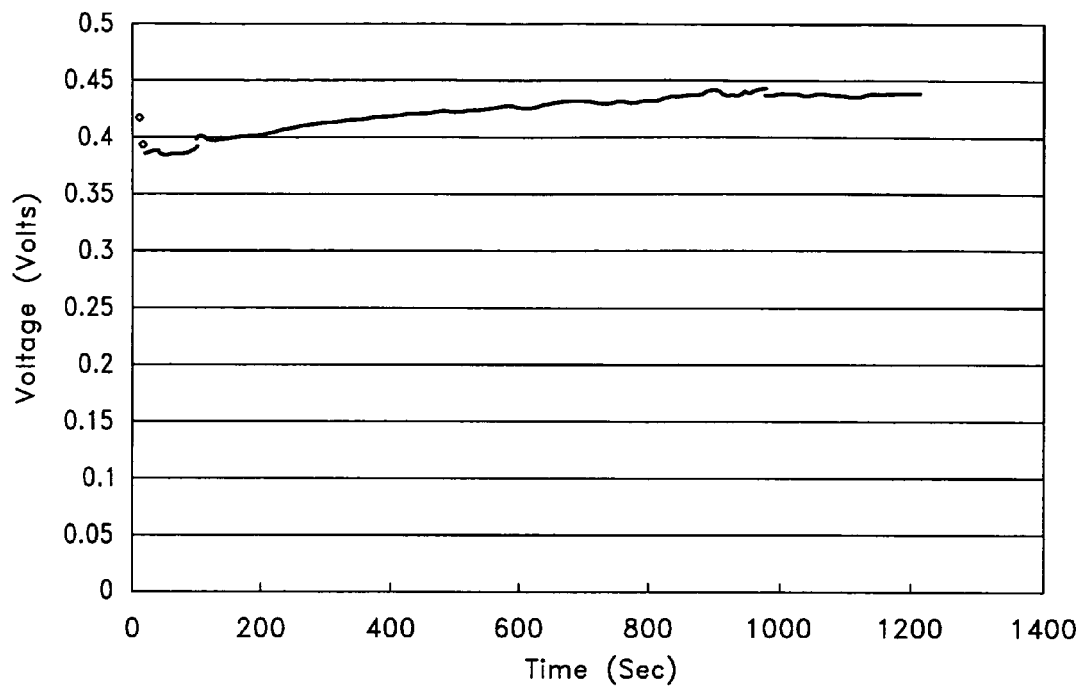
Figure 13:
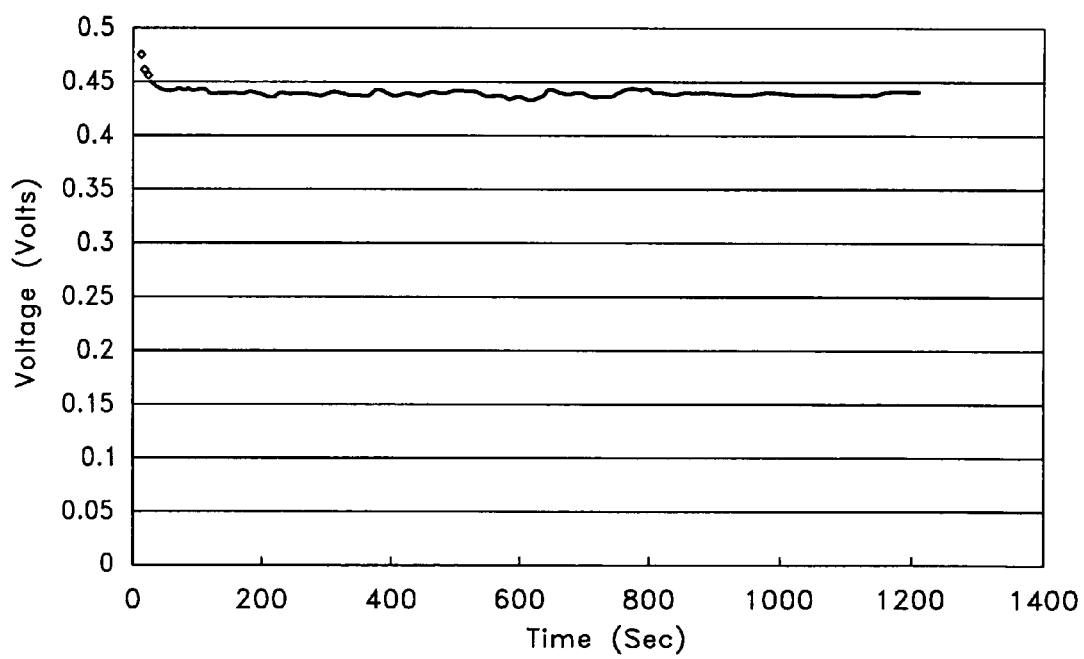

Test Results. FIGS. 12 and 13 show data for the two constant current test runs. The voltage during constant current test run number 1 (FIG. 12) increased after a short period of decline. Cell conditions such as temperature and humidity were likely improving during the run. The MEA could also be improving due to conditioning. The voltage during constant current test run number 2 (FIG. 13) remained very stable for the entire twenty minute run. The main difference between these runs and the runs described earlier in the main body is the higher current value. While the voltage for constant current test runs 1 and 2 was below that for the earlier runs (0.65 volts for the earlier runs and 0.45 for these runs), the data clearly show that this MEA performs significantly better.

Figure 14:
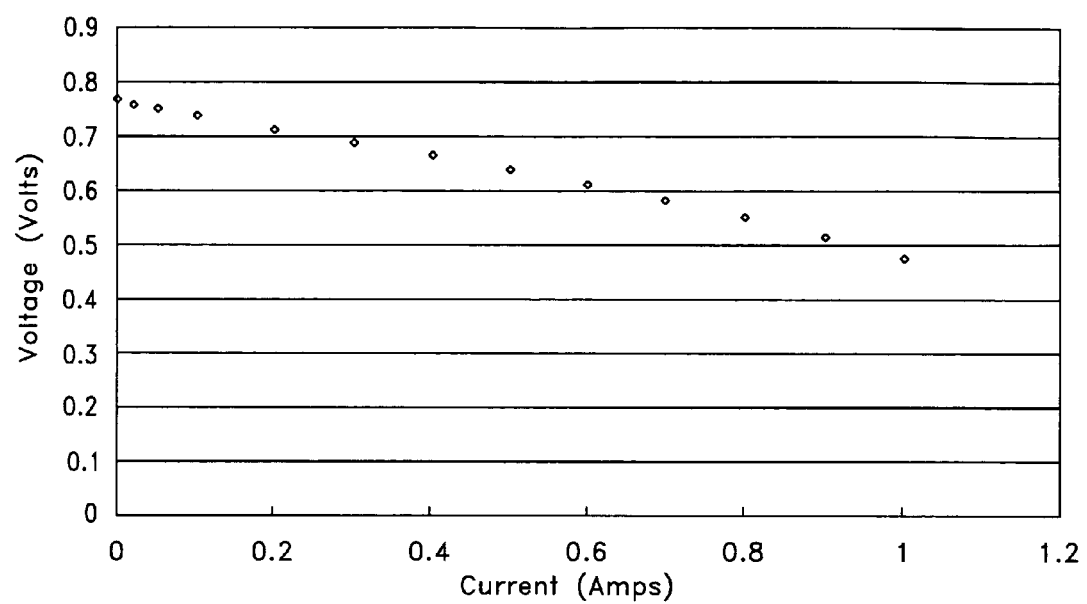
FIG. 14 is a graph of voltage over current resulting from additional testing of the bipolar plate of this invention.

FIG. 14 shows data from the variable current test run (VI curve data). The data looks similar to that shown in FIG. 9 in Example 1. Again the main difference is the current values. Whereas the voltage in the VI curve in the main body drops to roughly 0.5 volts at 200 mA, the voltage in the VI curve shown in FIG. 14 drops to 0.5 volts around 900 mA.

Summary. The additional tests performed using a new Ion Power, Inc. MEA show significant cell performance improvements for both the constant current test runs and the variable current test run (VI curve data). The only functional difference between the two sets of runs is the replacement of the old Ion Power, Inc. MEA with a new MEA. There is every reason to believe that using state-of-the-art MEAs would further improve cell performance.

The additional single cell tests using the molded carbon composite fuel cell plates support the conclusion described in the summary of earlier tests. These additional test data show that the somewhat low current values obtained in the original testing were clearly a function of the Ion Power, Inc. MEA and not attributable to the carbon composite fuel cell plate technology. The molded carbon composite fuel cell plate technology effectively delivered the power generated, regardless of the MEA output.

Example 3

A single bipolar plate 10 molded using the method of this invention and formulation A was tested for electric resistance characteristics. The three millimeter plate 10 was placed between two copper plates. When an ohm meter was applied to the individual bipolar plate with a three millimeter thickness, and sandwiched between two copper plates a resistance reading of 0.3 ohms was obtained, further indicative of satisfactory performance in a fuel cell.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A bipolar plate for a fuel cell, the bipolar plate comprising in combination:
   a mass of thin planar composite material having a first side opposite a second side;
   said first side having a plurality of recesses provided to have a hydrogen containing fuel cell reactant pass therethrough;
   said second side having a plurality of recesses provided to have an oxygen containing fuel cell reactant pass therethrough;
   said mass of composite material formed of a mixture of at least thirty percent carbon and up to about seventy percent resin;
   said resin adapted to have a liquid state and a solid state, with said resin and said carbon exhibiting a flowable form capable of flowing into a mold when said resin is in a liquid state and said carbon is mixed homogeneously with said resin;
   wherein said resin includes a polyester resin in styrene;
   wherein said mass of composite material includes a plasticizer;
   wherein said mass of composite material includes polytetrafluoroethylene;
   wherein said mass of composite material includes methylethylketone;
   wherein said mass of composite material includes organic peroxide methylethylketone as a catalyst; and
   wherein said mass of composite material includes between twenty and forty percent polyester resin in styrene, up to five percent plasticizer, up to five percent cobalt carboxylate in a solution of less than ten percent cobalt, up to five percent polytetrafluoroethylene, between thirty percent and ninety percent carbon, with a majority of said carbon in the form of graphite, up to five percent methylethylketone and up to five percent organic peroxide methylethylketone.

* * * * *